(12) United States Patent
Trueb

(10) Patent No.: US 7,731,131 B2
(45) Date of Patent: Jun. 8, 2010

(54) ROOF BLOCK

(75) Inventor: Thomas W. Trueb, Ellington, CT (US)

(73) Assignee: Dymotek, Inc., Ellington, CT (US)

( * ) Notice: Subject to any disclaimer, the term of this patent is extended or adjusted under 35 U.S.C. 154(b) by 125 days.

(21) Appl. No.: 12/228,723

(22) Filed: Aug. 15, 2008

(65) Prior Publication Data

US 2010/0038516 A1    Feb. 18, 2010

(51) Int. Cl.
*F16L 3/00* (2006.01)
(52) U.S. Cl. .................. 248/49; 52/169.9; 248/68.1
(58) Field of Classification Search .............. 248/49, 248/56, 68.1; 52/169.9, 263, 292, 677, 687
See application file for complete search history.

(56) References Cited

U.S. PATENT DOCUMENTS

| | | | |
|---|---|---|---|
| 4,513,934 A | 4/1985 | Pruyne | |
| 4,899,963 A | 2/1990 | Murphy | |
| D315,668 S | 3/1991 | Murphy | |
| 5,072,901 A | 12/1991 | Scott | |
| 5,217,191 A | 6/1993 | Smith | |
| D367,329 S | 2/1996 | Nelson et al. | |
| 5,685,508 A | 11/1997 | Smith | |
| 5,829,718 A | 11/1998 | Smith | |
| D436,522 S | 1/2001 | Neider et al. | |
| 6,250,591 B1 | 6/2001 | Cunningham | |
| 6,364,256 B1 | 4/2002 | Neider et al. | |
| 6,520,456 B1 | 2/2003 | Neider et al. | |
| 6,889,944 B2 | 5/2005 | Brandzel et al. | |
| D521,851 S | 5/2006 | Smart | |
| 7,168,210 B2 | 1/2007 | Krovats | |
| 7,278,613 B2 | 10/2007 | Roy | |
| 7,441,731 B2 * | 10/2008 | Smart et al. | 248/74.1 |
| 7,607,619 B2 * | 10/2009 | Smart et al. | 248/74.1 |
| 2006/0091265 A1 | 5/2006 | Smart | |
| 2007/0022676 A1 | 2/2007 | Krovats | |
| 2007/0045482 A1 | 3/2007 | Smart | |
| 2007/0120036 A1 | 5/2007 | Olle et al. | |
| 2008/0054143 A1 | 3/2008 | Collins et al. | |

OTHER PUBLICATIONS

Quick—Block brochure.
A Better Idea Inc. (2 pages from website).
Erico (2 pages from website).
Versablock (6 pages from website).
Advanced Support Products, Inc. (2 pages from website).
Gastite flyer (1 page).
C-Port (1 page from website).
Gutterpiller (1 page from web site).
Krauss Plastics, Inc. (3 pages from website).

(Continued)

*Primary Examiner*—Ramon O Ramirez
(74) *Attorney, Agent, or Firm*—Ira S. Dorman

(57) ABSTRACT

The roof block is highly versatile in its applications, and includes recess-forming structure that segregates and cradles a multiplicity of transversely extending conduits and other elongate members; channel-forming and passage-defining structure that facilitates the assembly and stable support of threaded rods for the attachment of accessories; structure for securing, and facilitating affixation of, hold-down means for supported members; and elements that facilitate the unified, compact assembly of a multiplicity of like blocks. The roof block is of lightweight and strong construction, is convenient to use, and is practical and economical to manufacture in bulk.

32 Claims, 13 Drawing Sheets

OTHER PUBLICATIONS

MAPA Products (10 pages from website).
OMG Roofing Products (4 pages from web site).
The Pate Company (1 page from flyer).
PHP Systems/Design (17 pages from web site).
Pipe Pier (2 pages from web site),
Quick "Pipe" Block (1 page from website).
Pro Pipe Industries (1 page from website).
Pipe Mounting Pedestals (1 page from web site).
Roof Top (RTA) Accessories (2 pages from web site).

* cited by examiner

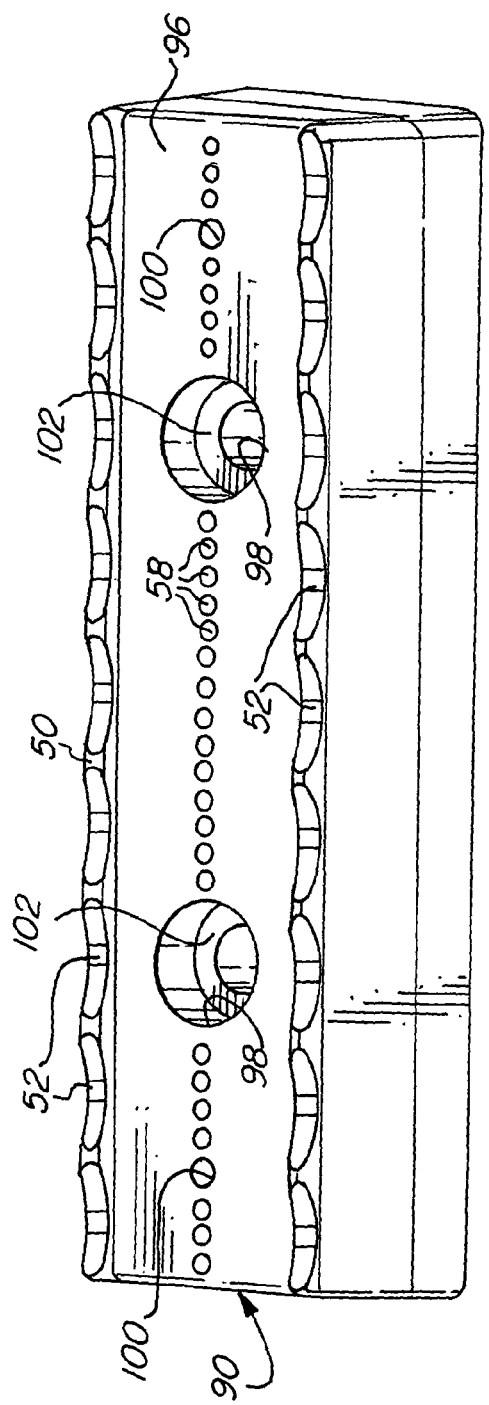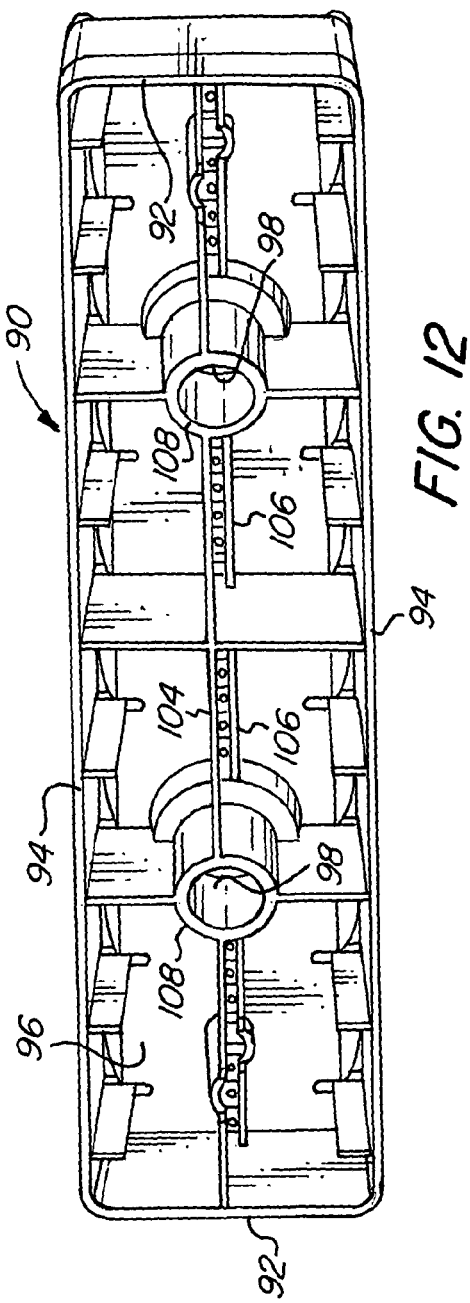

ROOF BLOCK

BACKGROUND OF THE INVENTION

So-called "roof blocks," or "support blocks," are widely used for organizing and supporting conduits of various kinds and other elongate members that are associated with utilities and roof-mounted equipment, such as electrical cables, gas pipes, refrigeration lines, etc. It is now common practice to employ roof blocks fabricated from synthetic resinous materials, in place of the wooden blocks that were previously used as conduit supports, and the following United States patent documents are representative of pertinent prior art:

Utility Patents:

U.S. Pat. No. 4,513,934
U.S. Pat. No. 4,899,963
U.S. Pat. No. 5,072,901
U.S. Pat. No. 5,217,191
U.S. Pat. No. 5,685,508
U.S. Pat. No. 5,829,718
U.S. Pat. No. 6,250,591
U.S. Pat. No. 6,889,944
U.S. Pat. No. 7,278,613

Design Patents:
  No. D 315,668
  No. D 436,522
  No. D 521,851

Patent Application Publications:

U.S. patent applicant Ser. No. 2006/0,091,265
U.S. patent applicant Ser. No. 2007/0,022,676
U.S. patent applicant Ser. No. 2007/0,045,482
U.S. patent applicant Ser. No. 2007/0,120,036
U.S. patent applicant Ser. No. 2008/0,054,143

Despite the level of activity in the art indicated by the foregoing, a need remains for a roof block that is highly versatile in its applications, extremely strong, stable, and durable, convenient to install and employ, and economical and practical to manufacture in volume.

SUMMARY OF THE INVENTION

It is a primary object of the present invention to provide a roof block, and a roof block assembly, that satisfies at least certain of the foregoing criteria. It is also an object of the invention to provide a roof block that is so constructed as to enable ready assembly with a multiplicity of like roof blocks to form a highly compact and stable unitized assemblage for transport in bulk.

It has now been found that certain of the foregoing and related objects of the invention are attained by the provision of a roof block comprised of a substantially hollow body, including a base portion and a pedestal portion upstanding on the base portion. The pedestal portion has an upper section that is configured to provide underlying support for a plurality of transversely extending elongate members. At least one passage extends downwardly into the pedestal portion and includes an aperture in the top wall; preferably, the pedestal portion will have a plurality of passages at laterally spaced locations, each including an aperture in the top wall.

The upper section of the pedestal portion has structure that defines one or more transverse channels extending beneath the top wall and into intersection with the downwardly extending passage or passages. The transverse channels are dimensioned and configured for receiving fastening elements for engagement with rods inserted into the corresponding downwardly extending passages, and will have open outer ends and effectively closed inner ends, the closed inner ends being defined by structure disposed proximate the top wall aperture of the associated passage and located on the side of the aperture that is remote from the outer end of the channel; such structure will normally be dimensioned and configured to engage a fastening nut against rotation, for receipt of and engagement with a threaded rod.

The roof block of the invention will typically have at least three downwardly extending passages and an equal number of associated transverse channels, and some of the passages and associated channels may desirably be larger than others; typically they will have nominal diameters of ½ inch or ⅜ inch. Each downwardly extending passage will preferably be defined by a tubular (usually, cylindrical) member that extends, within the pedestal portion, from the associated transverse channel and serves as a guide and a stabilizing structure for an assembled rod.

The upper section of the pedestal portion will normally be configured to provide constraining underlying support for the transversely extending elongate members with which it is to be used, desirably provided by a multiplicity of laterally spaced recess formations. More specifically, the pedestal portion may comprise upwardly projecting ridge structure that extends laterally along opposite sides of the top wall and that is formed to have a plurality of pairs of transversely aligned recesses, providing the recess formations.

In particularly preferred embodiments, indicia are provided on the top wall of the upper section of the roof block to facilitate positioning of fasteners comprising hold-down means for the supported members. The indicia will usually comprise a multiplicity of discrete elements that lie on at least one generally rectilinear axis, and normally the centerline of the downwardly extending passage or passages will substantially intersect with one such axis. The indicia will desirably extend diametrically, in opposite directions, from at least one of the apertures, and they will advantageously be detents formed into the upper surface of the top wall.

The upper section of the pedestal portion will most desirably include structure that extends downwardly from the underside of the top wall for engaging the threads of screw fasteners inserted at the indicia locations. Such structure may advantageously be provided by transversely spaced, laterally extending parallel wall elements, and may be comprised of reinforcing panels that extend between, and along the length of, the passage-defining cylindrical members; spacers between the wall elements may provide additional surfaces, to afford screw bite on four sides, and discrete elements, of cylindrical, boxlike, or other form, may be employed in place of the parallel wall elements to afford enhanced screw engagement. Additional reinforcement for the roof block may be provided by panels that extend transversely within the pedestal portion, from opposite sides of the cylindrical members.

The base portion of the roof block will usually define an upwardly extending, underlying recess dimensioned and configured for the receipt of a rigid insert piece, the latter being fabricated from a readily deformable material and having a portion that protrudes outwardly for contact with a supporting roof surface. In such embodiments, the base portion will advantageously comprise upper wall structure and a surrounding peripheral wall, or skirt, depending from the upper wall structure and cooperatively defining therewith the underlying recess.

The depending wall may be formed with a multiplicity of tab elements projecting therefrom at peripherally spaced locations, and normally being resiliently deflectable. Upon assembly of an insert piece within the underlying recess, the tab elements are readily deflected inwardly to dispose them within the recess and with an orientation directed toward the upper wall structure of the base portion, causing the tab elements to engage the edges of the insert piece (normally with some degree of penetration) and thereby to prevent inadvertent disassembly. The base portion of the roof block will desirably also have a multiplicity of lug formations projecting upwardly, at spaced locations about its periphery, for purposes to be described hereinbelow.

The body of the roof block will normally be integrally formed, as a single piece, from a synthetic resinous material. It will usually be substantially symmetrical, at least about a laterally extending central plane but desirably about a transversely extending central plane as well, and both the base portion and also the pedestal portion (exclusive of buttressing) will advantageously be of generally rectangular cross section. The pedestal portion will preferably be comprised of a pair of relatively wide sidewall sections and a pair of relatively narrow end walls sections, which may converge slightly so as to impart an upward taper to the pedestal portion.

Other objects of the invention are attained by the provision of a unified assembly of a multiplicity of at least three (but normally, many more) substantially identical roof blocks, constructed as herein described. The roof blocks in the assemblage are arranged in alignment with one another, with their central planes parallel and with a central block inverted, relative to two directly adjacent outer blocks, so as to dispose its pedestal portion in a nested relationship between the pedestal portions of the adjacent blocks. The lug formations of the outer roof blocks engage within at least one aperture provided in the top wall of the central block, so as to effectively unite the blocks and secure them in assembly with one another.

Preferably there will be at least two lug formations along each of the opposite sides of the base portion, which will fit within at least two of the apertures in the top wall of the central roof block to engage the surrounding structure. Because the apertures will usually be circular, the lug formations will usually be of semicircular cross section and oriented with a diametrical side facing outwardly and a curved side facing inwardly. The diameters of the lug formations will be such that a pair of them, disposed with their diametrical sides contiguous, will be snugly received within each of the engaging apertures, one of each pair of lug formations being present on each of the outwardly disposed roof blocks. The lug formations may serve additional functions as well, such as to engage one end of a member that is secured to the roof at its opposite end to provide a so-called seismic, or hurricane, restraint.

BRIEF DESCRIPTION OF THE DRAWINGS

FIG. 11 is a top perspective view of an extension piece constructed for use in assembly with the body of a roof block of the general form depicted in the previous figures;

FIG. 12 is a bottom perspective view of the extension piece of FIG. 11;

Figure 1A:
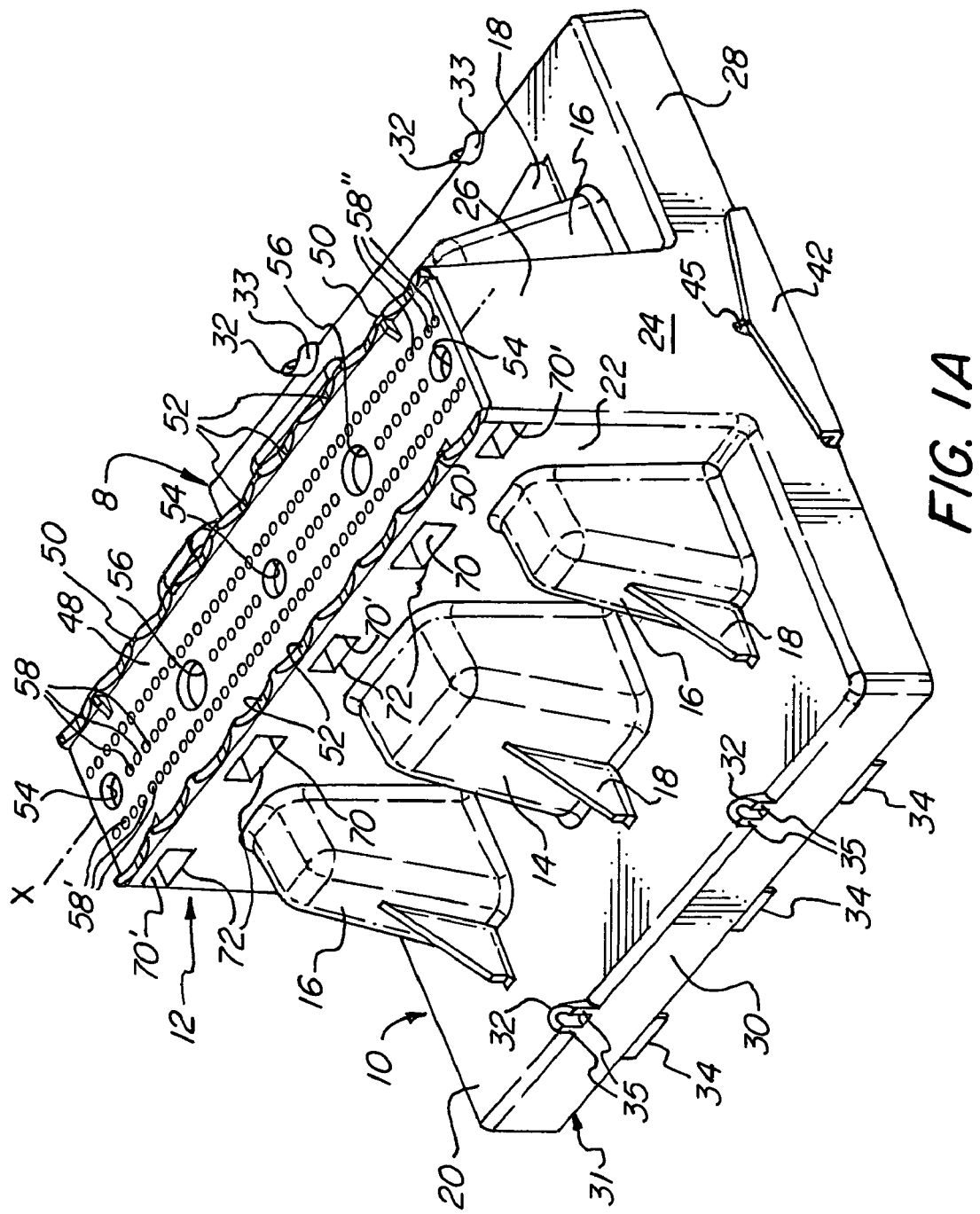
FIG. 1A of the drawings is a perspective view of the body of a roof block embodying the present invention, depicted in its upright, normal orientation of use.

DETAILED DESCRIPTION OF THE PREFERRED
AND ILLUSTRATED EMBODIMENTS

Turning now to detail to FIGS. 1-9 of the appended drawings, therein illustrated is a roof block embodying the present invention and consisting of a hollow body, generally designated by the numeral 8, comprised of a base-portion and a pedestal portion, generally designated respectively by the numerals 10 and 12. The body will normally be molded from a strong, tough, durable and weather-resistant synthetic resinous material, such as high-density polyethylene, which material will desirably also have inherent vibration-dampening properties.

The pedestal portion 12 of the body 8 includes a relatively large central buttress formation 14 on each side of the body, and adjacent pairs of smaller lateral buttress formations 16. The base portion 10 consists of upper wall sections 20, which merge with sidewall sections 22 on the opposite sides of the pedestal portion 12. The sidewall sections 22 converge toward a central, laterally extending plane at a slight angle (e.g. 2° to 4° from perpendicular to the adjacent upper wall section 20, or from vertical in the normal orientation of the roof block), which central plane also lies on the laterally extending centerline axis "X." A gusset element 18 is formed between each of the buttress formations 14, 16 of the pedestal portion 12 and the adjacent upper wall section 20 of the base portion 10, to impart added strength to the body 8.

The end walls 24 of the body 8 are of generally T-shaped configuration (inverted in the normal orientation of the roof block), and each wall 24 provides both a pedestal wall section 26 and also a transverse base wall section 28, the latter cooperating with lateral wall sections 30, extending along the opposite sides of the body, to define a depending peripheral wall or skirt, generally designated by the numeral 31. A pair of lug formations 32 are formed at laterally spaced locations along each side of the base portion 10, at the intersection of the upper wall section 20 and the contiguous lateral wall section 30; each lug formation 32 has a semi-cylindrical, inwardly facing surface 33 on one side and an outwardly facing diametrical surface on the other side, comprised of coplanar surface elements 35.

Figure 1B:
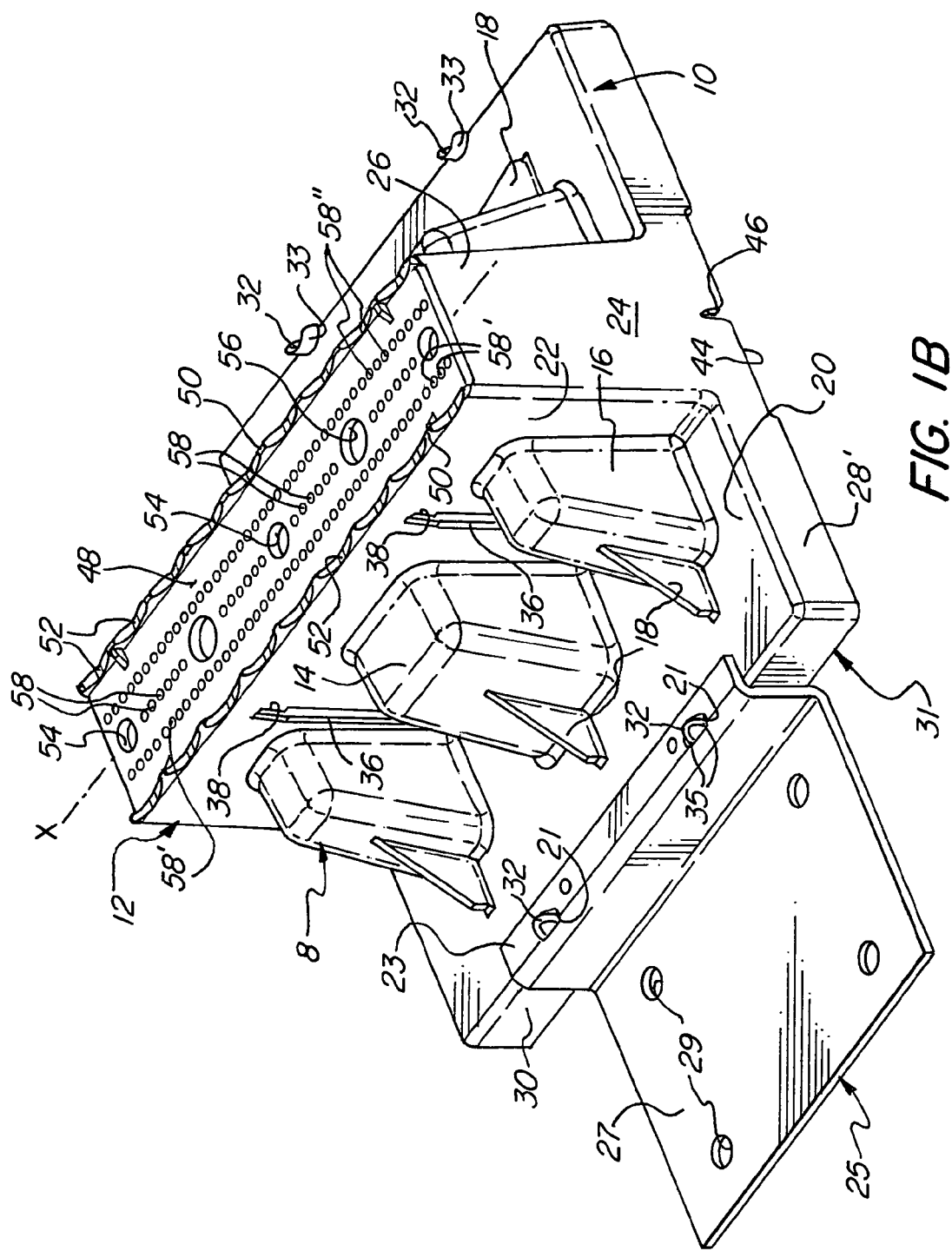
FIG. 1B is a perspective view of the body of the roof block in the same orientation but from the opposite end, drawn to a slightly reduced scale and having a seismic restraint plate assembled therewith.

One function of the lugs 32 is illustrated in FIG. 1B. As can be seen, the lug formations 32 along one side of the roof block are received in semicircular apertures 21 formed through an elevated flange portion of a seismic, or hurricane, constraint piece, generally designated by the numeral 25. A bottom panel 27 of the constraint 25 is formed with four holes 29, which serve to receive suitable fasteners (not shown) for securing it to a roof surface and thereby to readily affix the roof block against displacement when subjected to forces of nature. Needless to say, other means for securement (e.g., adhesive bonding) can be used, if preferred, and the panel 27 can be covered with roofing material (e.g., tar) if so desired.

A row of three, laterally spaced, resiliently deflectable tabs 34 extend along the bottom edge of each lateral wall section 30 of the peripheral flange 31 on the base portion 10, and a pair of rib-like clip elements 36 extend vertically on one of the sidewall sections 22 of the pedestal portion 12, each clip element 36 having an upper end that is notched at 38. A series of internal reinforcing ribs 40 is provided within the depending peripheral wall 31 of the base, again for imparting added strength to the body.

A coupling flange 42, defining a transversely extending channel 43, is formed along the lower edge of the base wall section 28 at one end of the body 8, and the wall section 28', at the opposite end of the body, is upwardly indented at 44 with a configuration that includes a central notch 46. It will be appreciated that the notched end wall section 28' is constructed to seat within the channel 43 formed by the coupling flange 42 of a directly adjacent roof block body 8, arranged end-to-end so as to enable two or more of the bodies to be interengaged as a linear gang. Although only barely visible in FIG. 1, an upstanding rib 45 is formed within the channel 43 of the coupling flange 42, and is received in the notch 46 of an assembled end wall section 28', so as to also provide transverse stability to such a gang of blocks.

The top wall 48 of the pedestal portion 12 is generally rectangular and planar, and is bordered, along its longer sides, by a pair of parallel ridges 50. A series of nine recesses 52 are formed into each of the ridges 50, the recesses 52 being paired, from side-to-side, so as to cooperatively define nine cradle formations for generally conformably and constrainingly supporting, at laterally separated positions, a multiplicity of transversely extending elongate members (such as conduit "C" shown in FIG. 8), with the wall 48 providing an underlying support surface therebetween.

Five circular apertures, aligned on the centerline axis X of the top wall 48 (and hence on the central, laterally extending plane of the pedestal portion 12 and, in turn, of the roof block body 8) are formed through the top wall 48 at equidistantly spaced positions, the central and endmost apertures 54 being relatively small (typically, about ⅜ inch nominal diameter) and the interpositioned apertures 56 being relatively large (typically about ½ inch nominal diameter). Four sets of five detents 58 extend into the upper surface of the top wall 48 between the apertures 54, 56 (i.e., on the axis X); additional detents 58' and 58" extend laterally, in two parallel lines, in the margins between the centerline axis and each of the ridges 50.

Figure 2:
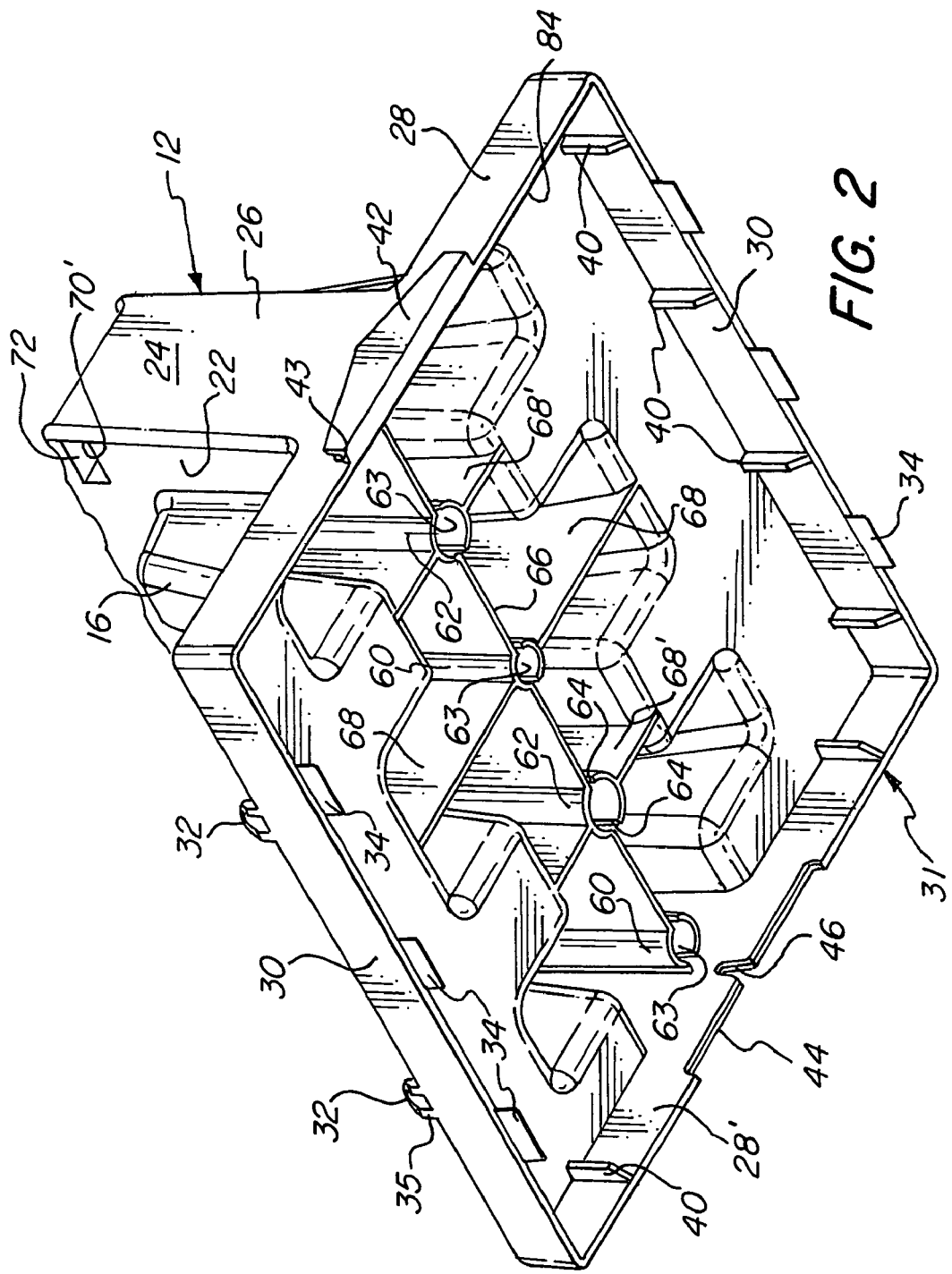
FIG. 2 is a bottom perspective view of the body of the roof block of FIG. 1.
Figure 3:
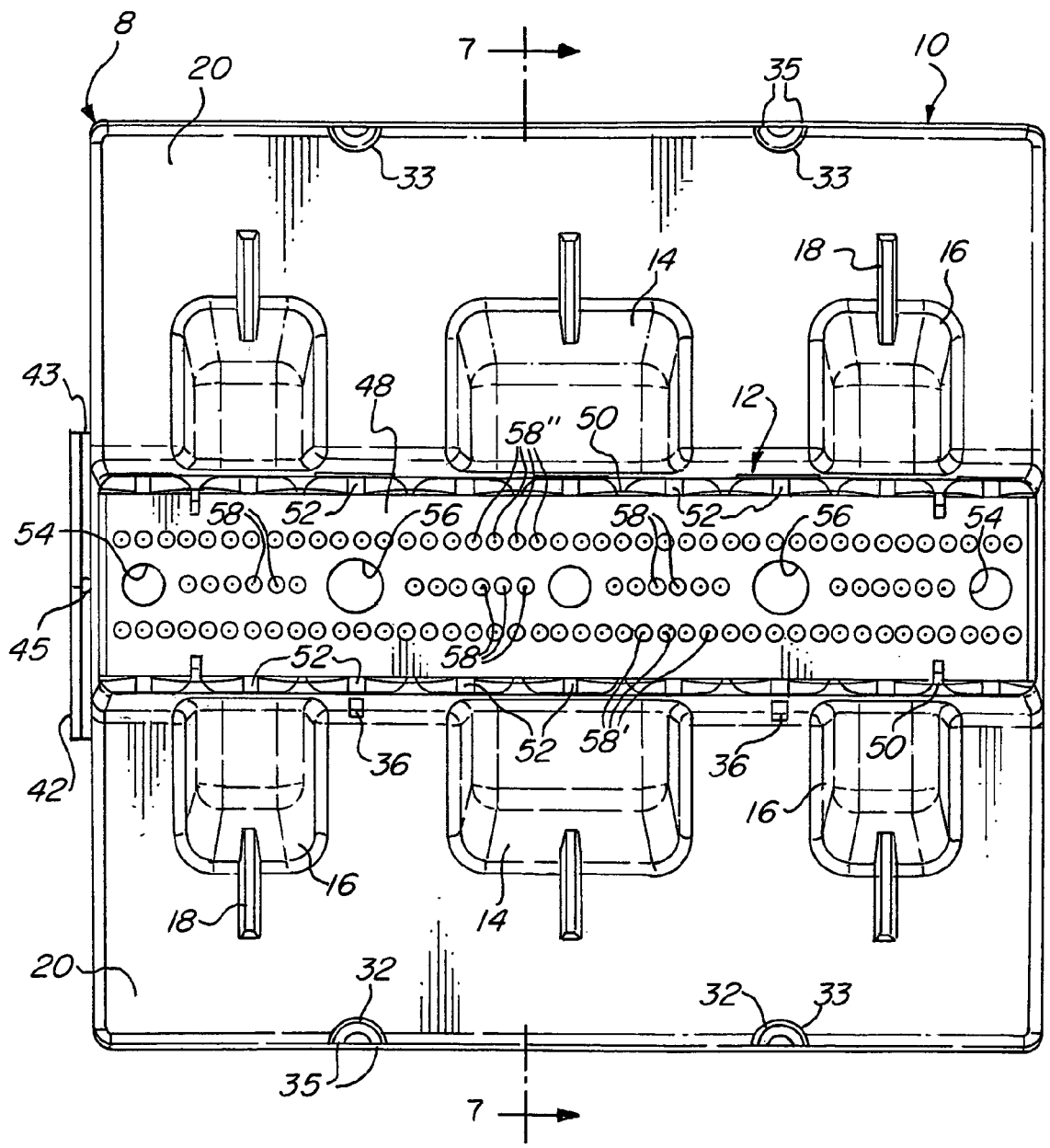
FIG. 3 is a plan view of the roof block body of FIGS. 1 and 2.
Figure 4:
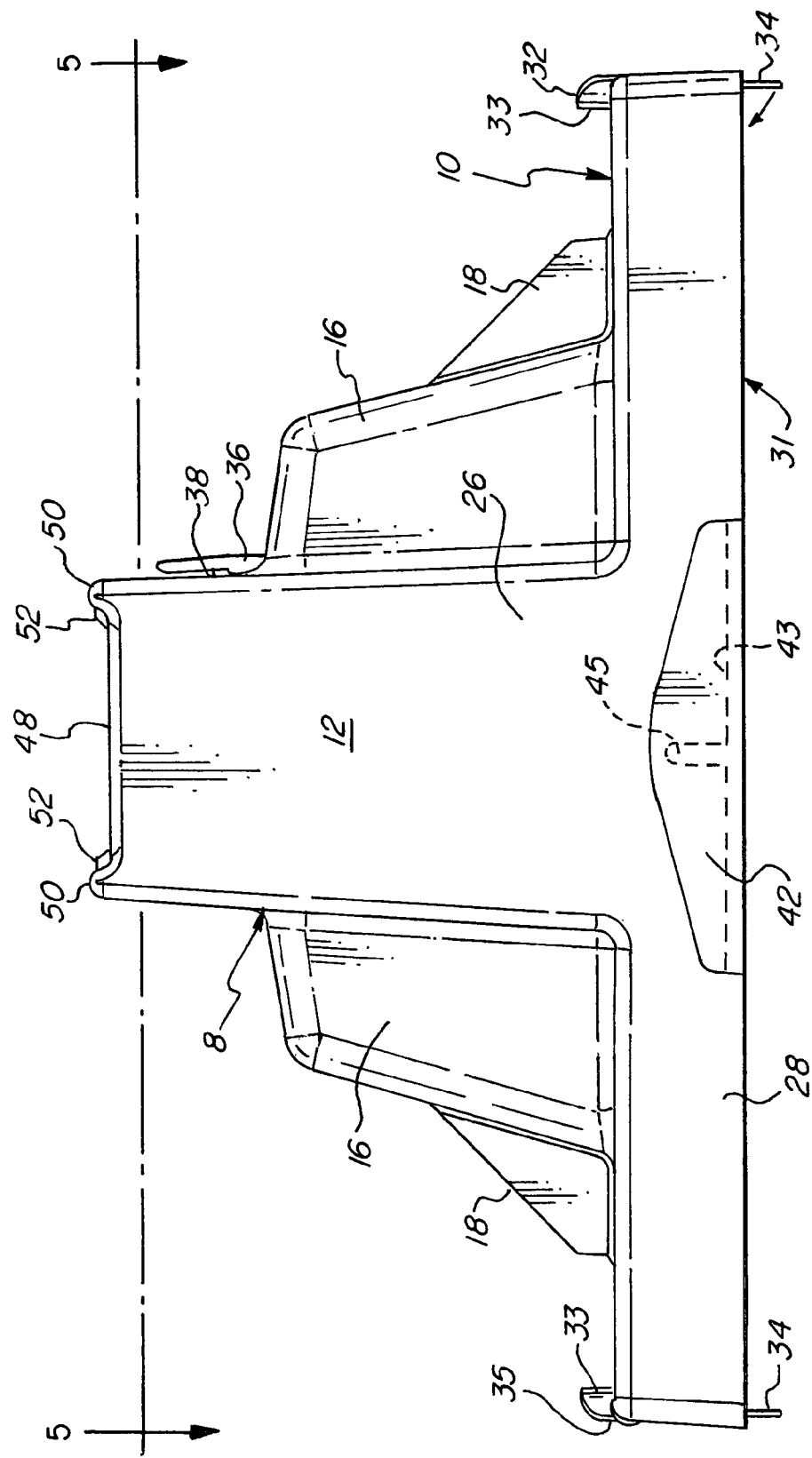
FIG. 4 is an elevational view, taken from one end of the roof block shown in the previous figures.
Figure 6:
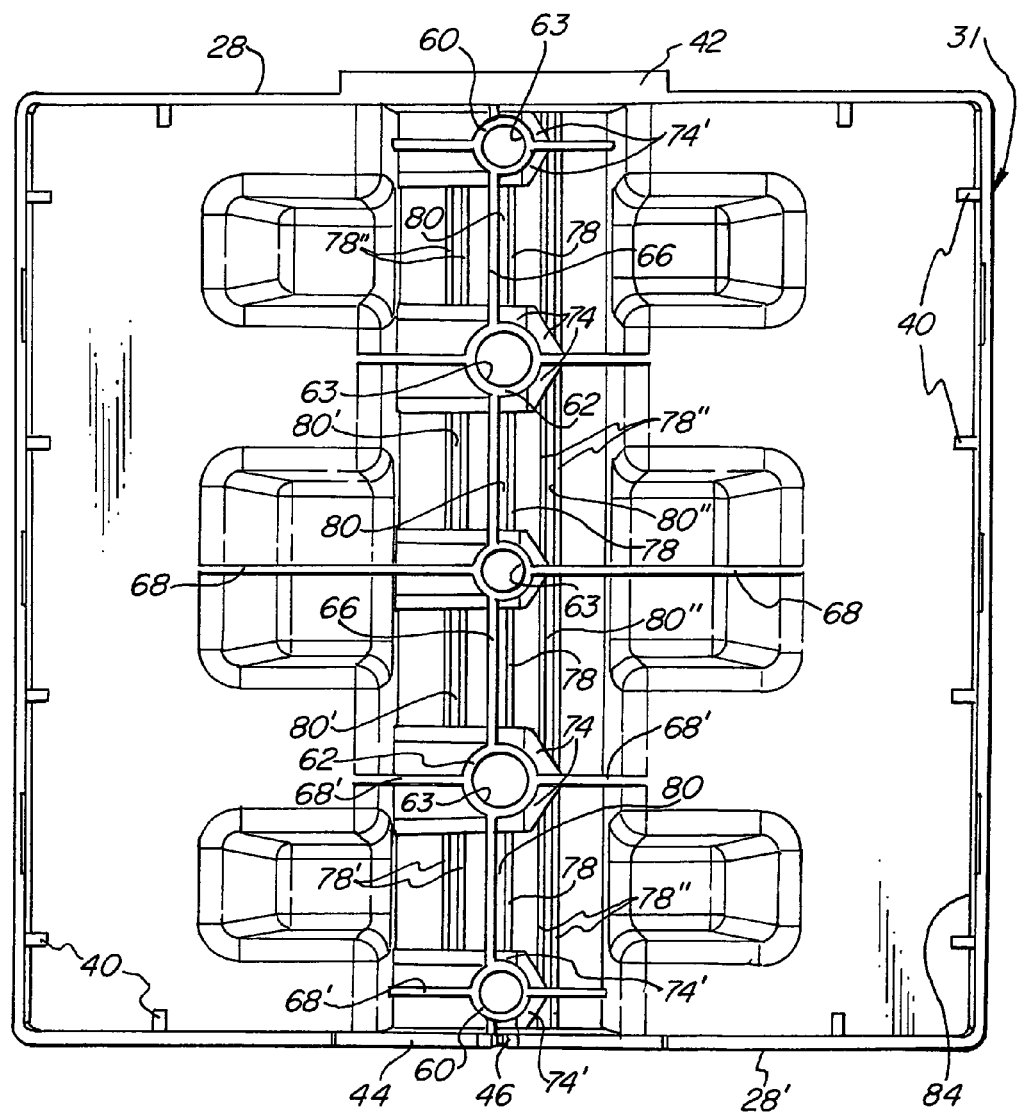
FIG. 6 is a bottom view of the roof block body.
Figure 7:
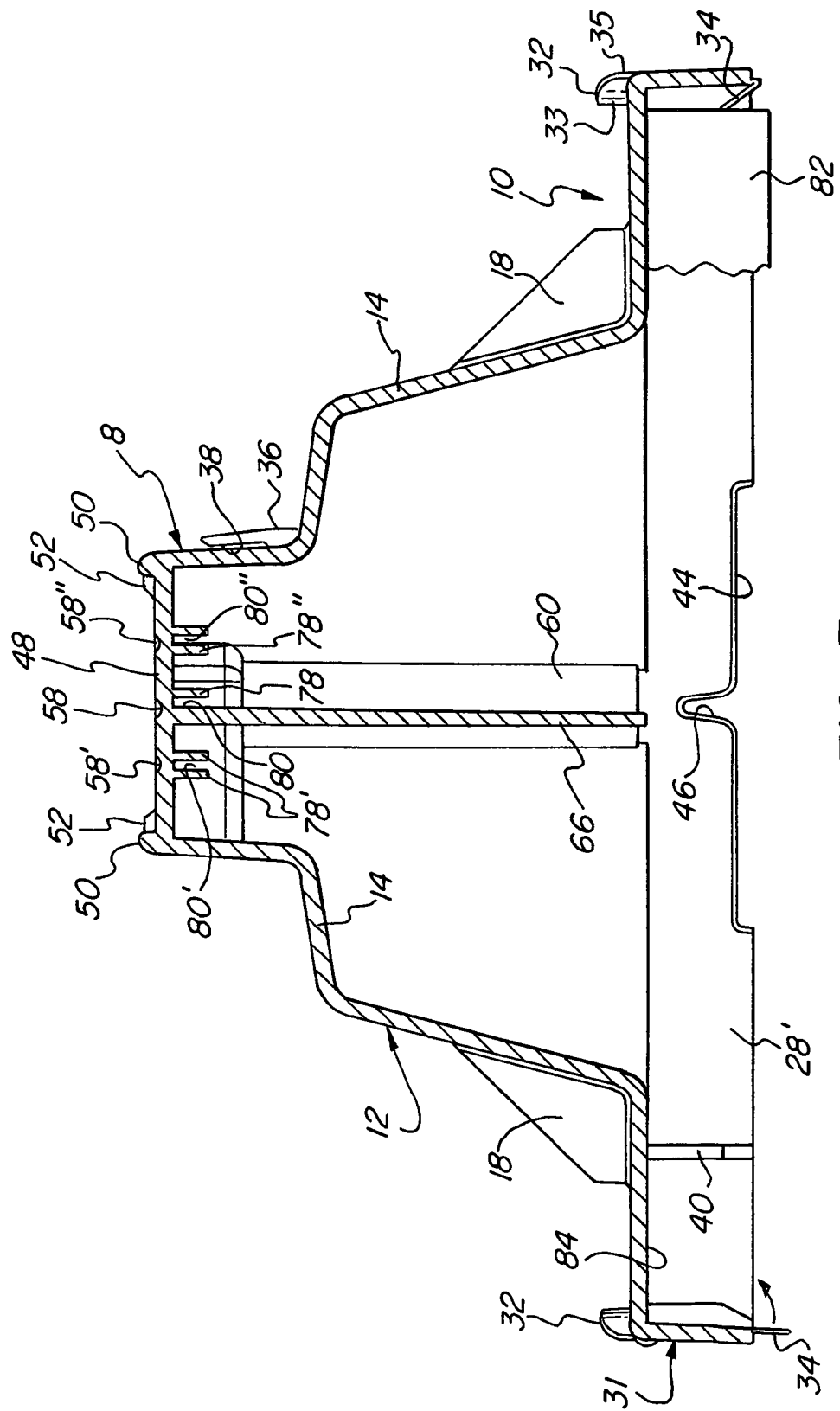
FIG. 7 is a vertical sectional view of the roof block body, taken along line 7-7 of FIG. 3.

As can best be seen in FIGS. 2, 6, and 7, cylindrical formations 60, 62 extend normal to the top wall 48, at laterally spaced locations along the central axis X; the formations 60, 62 are coaxial with the apertures 54, 56 and are of corresponding diameters. The cylindrical formations 60, 62 cooperate with the apertures 54, 56 to define five normally vertical passages 63 through the pedestal portion 12 of the body 8 along the central plane thereof; it should be appreciated however that the roof block need define only a single passage, and can include more or fewer than five, as may be desired. Each cylindrical formation 60, 62 has a pair of notches 64 formed into its lower edge, at diametrical positions, which permit (despite the presence of an insert piece, to be described, overlying the bottom openings) the ready escape of any water that might enter through the apertures 54, 56.

As is also seen in these figures, laterally extending, normally vertical panels 66 interconnect the several cylindrical formations 60, 62 along their lengths, and transversely extending panels 68, 68' connect the cylindrical formations to the buttress formations 14 or to the wall 22 of the pedestal portion 12 disposed therebetween. The panels 66, 68, 68' form a grid to provide internal reinforcement for the pedestal portion 12 of the body 8, and thereby contribute substantially to the high level of strength exhibited by the roof block (despite its hollow construction).

Figure 8:
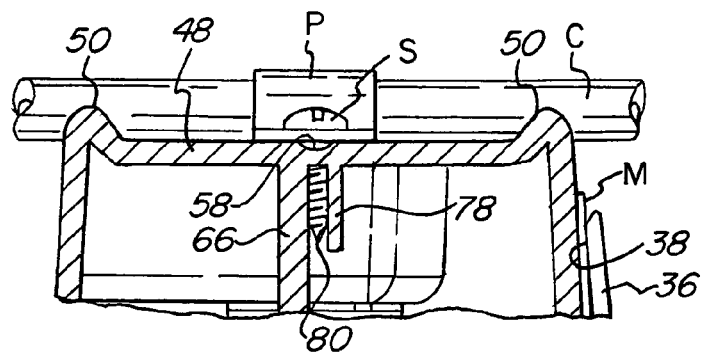
FIG. 8 is a fragmentary sectional view, drawn to an enlarged scale, taken along line 7-7 of FIG. 3 and showing an upper section of the pedestal portion of a slightly modified form of the roof block, supporting a transversely extending conduit and having hold-down means fastened thereto.
Figure 9:
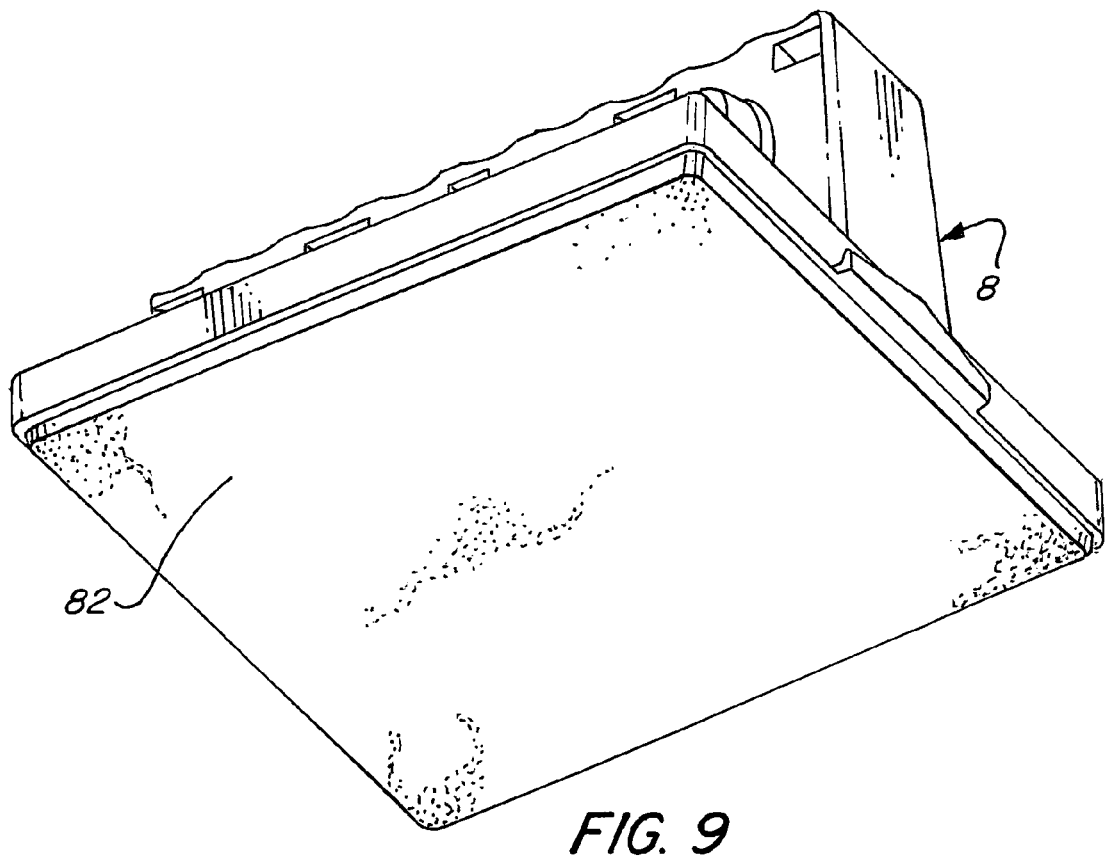
FIG. 9 is a perspective view, taken from below, of a roof block assembly embodying the present invention.

As may best be appreciated from FIG. 7, the laterally extending reinforcing panels 66 are offset slightly to one side of the central plane of the pedestal portion 12. Four relatively short and narrow strip elements 78 depend from the top wall 48 and extend generally parallel to the panels 66, offset to the opposite side of the central plane. Thus, the panels 66 and strip elements 78 effectively define a series of slots 80, disposed directly beneath the central line of detents 58, and provide structure for engaging the threads of screws "S" (one of which is seen in FIG. 8, which Figure is modified from FIG. 7 to employ only a single line of detents and corresponding underlying engaging elements) which are inserted through the top wall 48 at the locations of selected indicia 58. The screws serve to affix the opposite ends of metal hold-down pieces "P" (only one end of one of which is visible in FIG. 8), to in turn secure the supported conduit "C" in place within the cradle provided by the associated pair of transversely aligned recesses 52. The hold-down piece "P" may be cut from a strip of metal banding or strapping material "M," which is conveniently stored on-board the roof block, for ready access, by inserting it into the notched upper ends 38 of the rib-like clip elements 36, as is also depicted in FIG. 8 (and FIG. 10).

Figure 5:
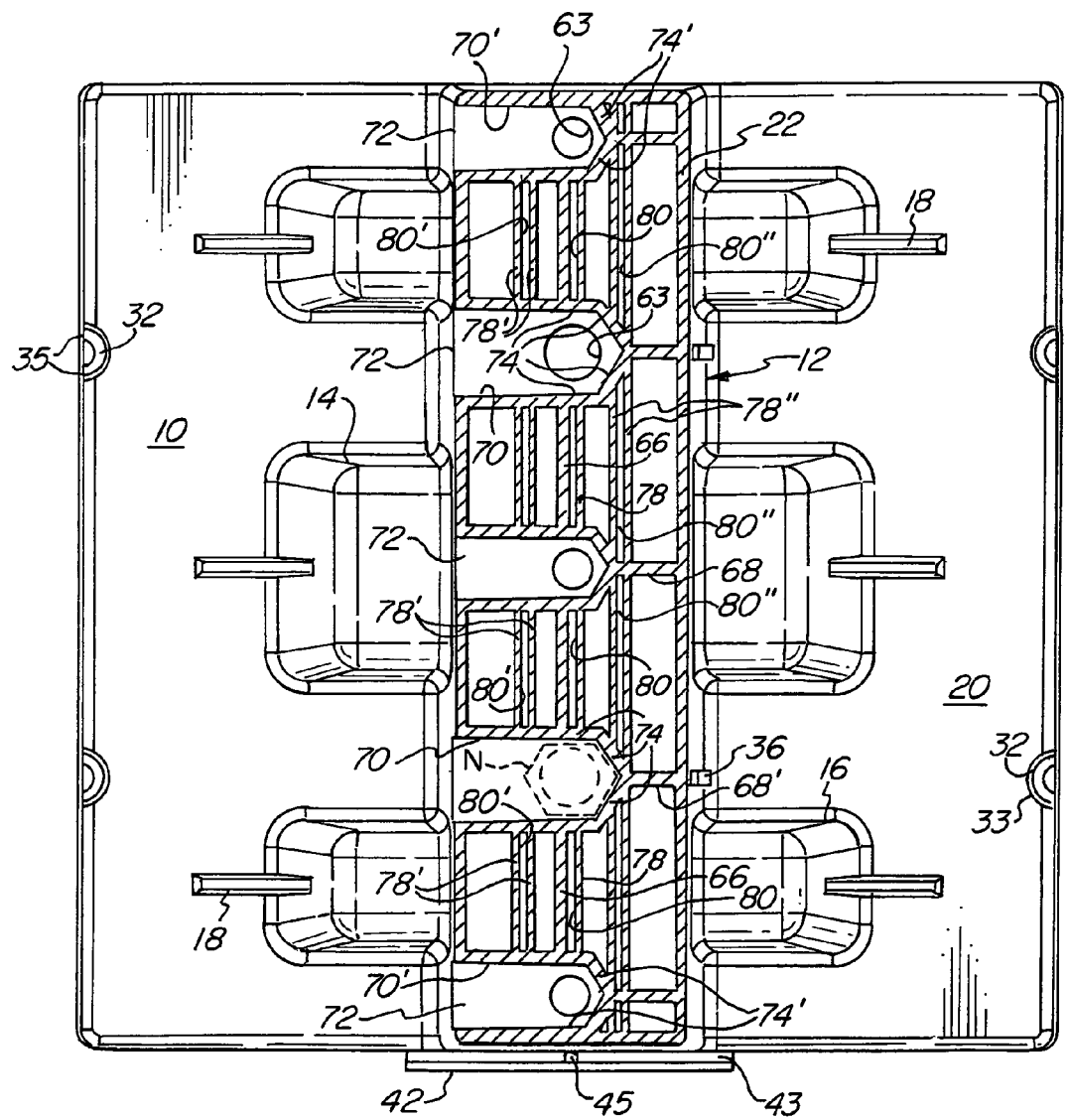
FIG. 5 is a horizontal sectional view of the roof block body, taken along line 5-5 of FIG. 4.

As is seen in FIGS. 5 to 7, the pedestal portion includes additional strip elements 78' and 78", which depend from the top wall 48 and are paired to provide structures, aligned under the marginal lines of detents 58' and 58", which define slots 80', 80" in which threaded fasteners can be securely retained. Although not illustrated, the engaging structures can be formed with transverse pieces to subdivide the slots 80', 80" and provide boxlike parts; alternatively, discrete cylindrical or boxlike elements can be substituted for the strip elements entirely, if desired.

A particularly advantageous feature of the roof block of the invention resides in the provision of transverse channels 70, 70', which extend inwardly from one side of the pedestal portion 12 of the body 8 directly beneath the top wall 48 to intersect with the vertical passages defined by the cylindrical formations 60, 62, with which they are corresponding sized (albeit somewhat enlarged). Each channel 70, 70' has an end 72 that opens on one sidewall section 22 of the pedestal portion 12 (although they need not all open on the same side) and, as is perhaps best seen in FIGS. 5 and 6, is closed at its inner end by stop structure 74, 74' of hexagonal form; i.e., the structure defines four wall sections mutually disposed at included angles of 120°. The resultant semi-hexagonal formations are located adjacent to the corresponding apertures 54, 56 of each associated passage, to the side thereof distal from the open end 72 of the channel, and hence they are positioned to receive and capture, against rotation, standard hexagonal nuts "N" (one of which is depicted in broken line in FIG. 5).

Figure 10:
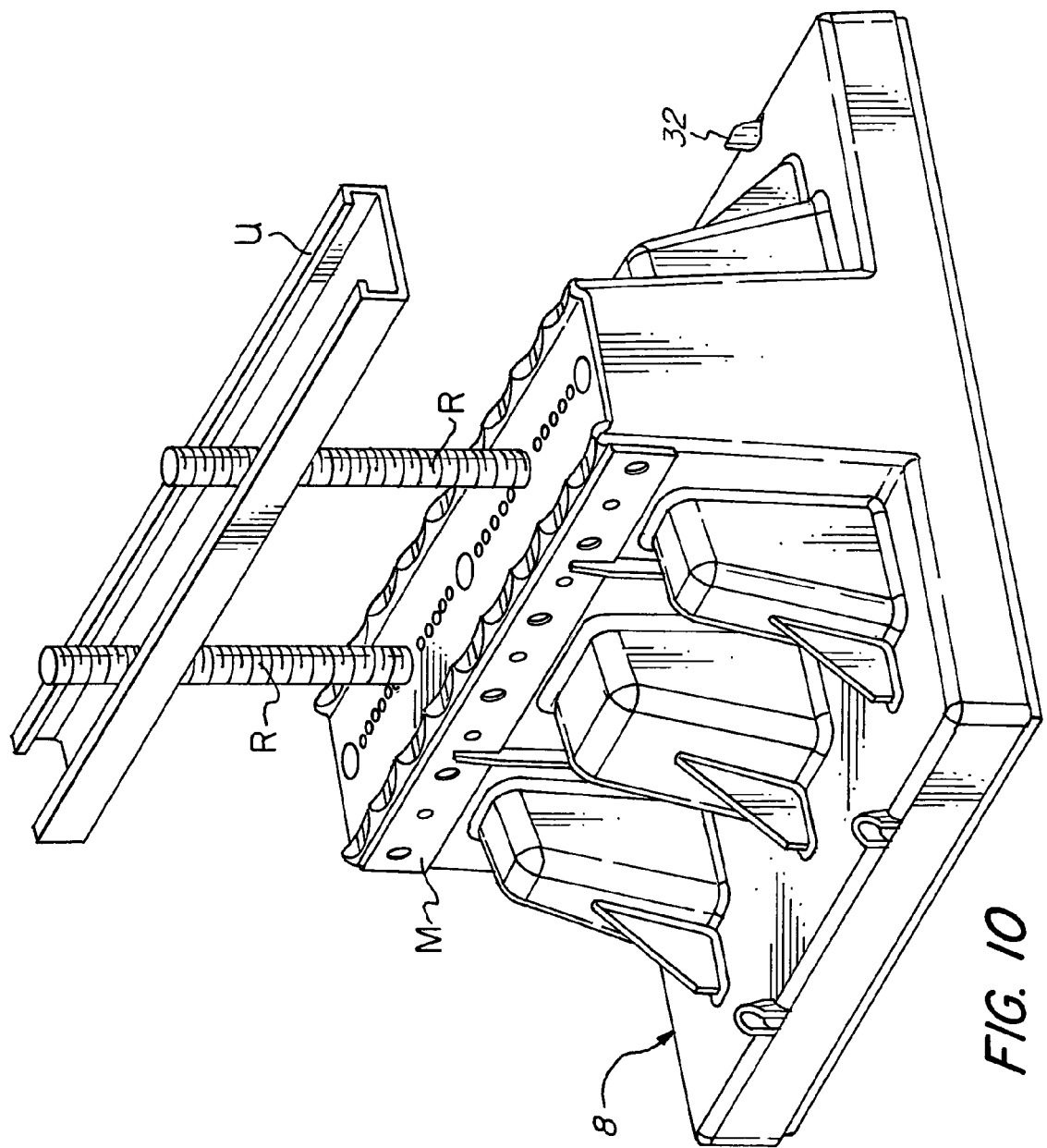
FIG. 10 is a perspective view showing an assembly comprised of a roof block embodying the invention, to which is attached (be means not shown) a pair of threaded support rods and a laterally extending channel piece.

This arrangement greatly facilitates the assembly of threaded rods "R," which are (as seen in FIG. 10) conventionally used as supports for (or integral with) various superstructure accessories for, and attachments to, roof blocks (e.g., hangers, yokes, "unistrut" channel pieces "U," and the like). Thus, the nut need merely be inserted into the selected channel 70, 70' until it bottoms on the semi-hexagonal end-closing structure 74, 74', with the threaded hole through the nut aligned under the aperture 54, 56. An end of the threaded rod need only then be inserted through the aperture and turned, whereupon it will become threadably engaged with the nut and can be readily adjusted to extend to the height desired. A locking nut (not shown) can then be screwed down onto the rod so as to securely affix it to the top wall 48 of the block. Needless to say, the stop structure may have other forms, depending upon the nature of the fastener and the upright member with which it is engaged (e.g., an unthreaded rod or a noncircular rod, such as bar stock, etc.).

It will be appreciated that any number of the passages provided can be employed for the receipt and engagement of a rod, and that such rods may be used individually for attachment of an accessory, e.g., a yoke, or split-ring hanger. The use of lighter weight rods (e.g. ⅜-inch diameter) will often suffice to support smaller conduits (e.g., ½-inch to 2-inch diameter pipes), whereas heavier rods (e.g., ½-diameter) will typically be used for larger conduits (e.g., pipes of 2-inch to 5-inch diameter). And although threaded rods will generally be utilized with roof blocks of the present kind, other forms of support may suitably be used in appropriate circumstances.

The body 8 of the roof block is additionally constructed to accommodate a bottom insert piece 82, as seen in FIGS. 7 (fragmentarily), 9, 10 and 14. Normally, the insert piece 82 will be of rectangular shape, dimensioned and configured to substantially fill the cavity 84 defined within the base portion 10 of the body 8 and to protrude (at least in certain areas) beyond the lower edge of the peripheral wall 31. The insert piece 82 will normally be a panel of foamed synthetic resinous material, such as extruded polystyrene, and it should be sufficiently rigid to provide a firm, strong and stable foundation for the roof block while, at the same time, being sufficiently deformable as to accommodate irregularities in the supporting surface, such as stones, pebbles, grit, seams, and the like; such deformation will indeed enhance interengagement and thereby inhibit undesirable displacement of the roof block.

As depicted in FIG. 7, the tabs 34, which project from the bottom edge of the peripheral wall 31 (as produced), provide a convenient means for securing the foam insert piece 82 in place within the bottom cavity 84. In the course of assembling the piece 82, the tabs 34 are deflected inwardly (as indicated by the curved arrow) so as to lie, with an upwardly and inwardly angled orientation, between the inside surface of the wall 31 and the peripheral edge surface of the insert piece 82. In that orientation the free, outer ends of the tabs 34 engage, and penetrate slightly, the material of the insert and secure it against inadvertent disassembly.

Turning now in detail to FIGS. 11 and 12 of the drawings, therein illustrated is an extension piece, generally designated by the numeral 90 and constructed for mounting upon the pedestal portion 12 of a roof block body 8 of the kind hereinabove described. The extension piece 90 will normally be integrally formed (molded), as a single piece, from the same material as the roof block body 8, and it has end walls and sidewalls, 92, 94, which cooperate with a top wall 96 to define a generally hollow body. The end walls and side walls 92, 94, are upwardly tapered, at substantially the same angle as the sidewall sections 22 and end walls 24 of the pedestal portion 12 of the block body, so as to seat thereupon in a close-fit relationship.

The top of each extension piece 90 is constructed similarly (if not identically) to the upper portion of the pedestal portion 12, and includes parallel ridges 50 along the tops of the sidewalls, in which are formed transversely aligned pairs of recesses 52 to receive and cradle, at transversely spaced positions, conduits and other elongate members for the support of which the roof block is intended. The extension piece 90 differs slightly from the roof block body hereinabove described (and hence would be adapted for use with a correspondingly different form of body) by virtue of having only two relatively large apertures 98 and two relatively small apertures 100, between adjacent ones of which however a line of detents 58 again extends, rectilinearly and on the centerline; two or more lines of detents may of course be provided on an extension piece, if desired.

It will be noted that the relatively large apertures 98 of the extension piece 90 are defined by countersunk annular elements 102, forming (with the adjacent cylindrical wall sections, unnumbered) wells within which fasteners, used to hold the extension piece 90 in place, can be contained. Normally, the fasteners would be nuts (not shown) engaged upon threaded rods, and nuts would of course (in those instances) also secure the rods from below. Recessing the fasteners in this manner can serve to minimize interference with a conduit or other member that is seated in an aligned cradle-defining recesses 52.

As seen in FIG. 12, the extension piece 90 includes strip elements 104, 106, and cylindrical formations 108. The strip elements 104, 106 serve the same purpose as the panels 66 and strip elements 78 in the pedestal portion of the body 8 hereinabove described, in cooperatively providing structure for improved engagement of threaded fasteners inserted at the detent locations.

Figure 13:
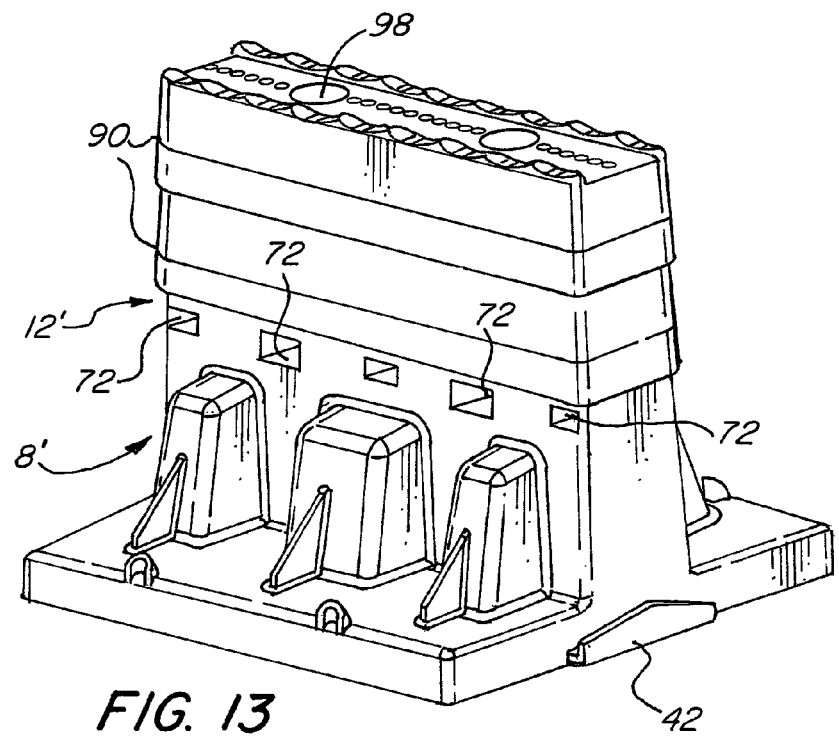
FIG. 13 is a perspective view showing a roof block embodying the invention, upon which are mounted two extension pieces, one atop the other.

FIG. 13 depicts an assembly consisting of a roof block body 8', upon the top of the pedestal portion 12' of which are mounted two extension pieces 90 (one atop the other). The assembly may also include threaded rods "R" (not shown) secured in the apertures 98, 100 and serving for the attachment of conventional accessories.

Figure 14:
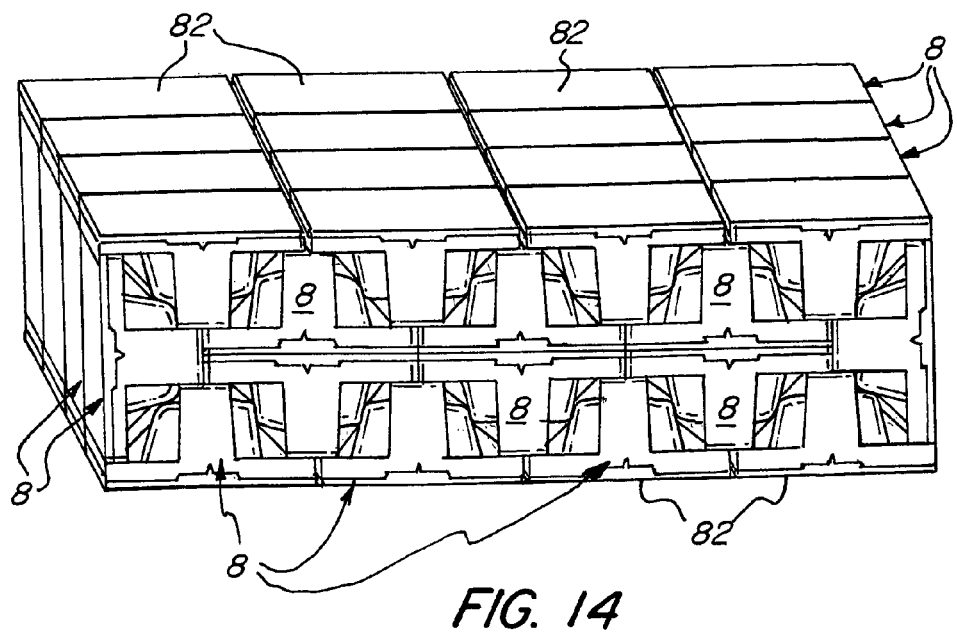
FIG. 14 is a perspective view showing a unified assemblage of a multiplicity of identical roof blocks embodying the present invention.
Figure 15:
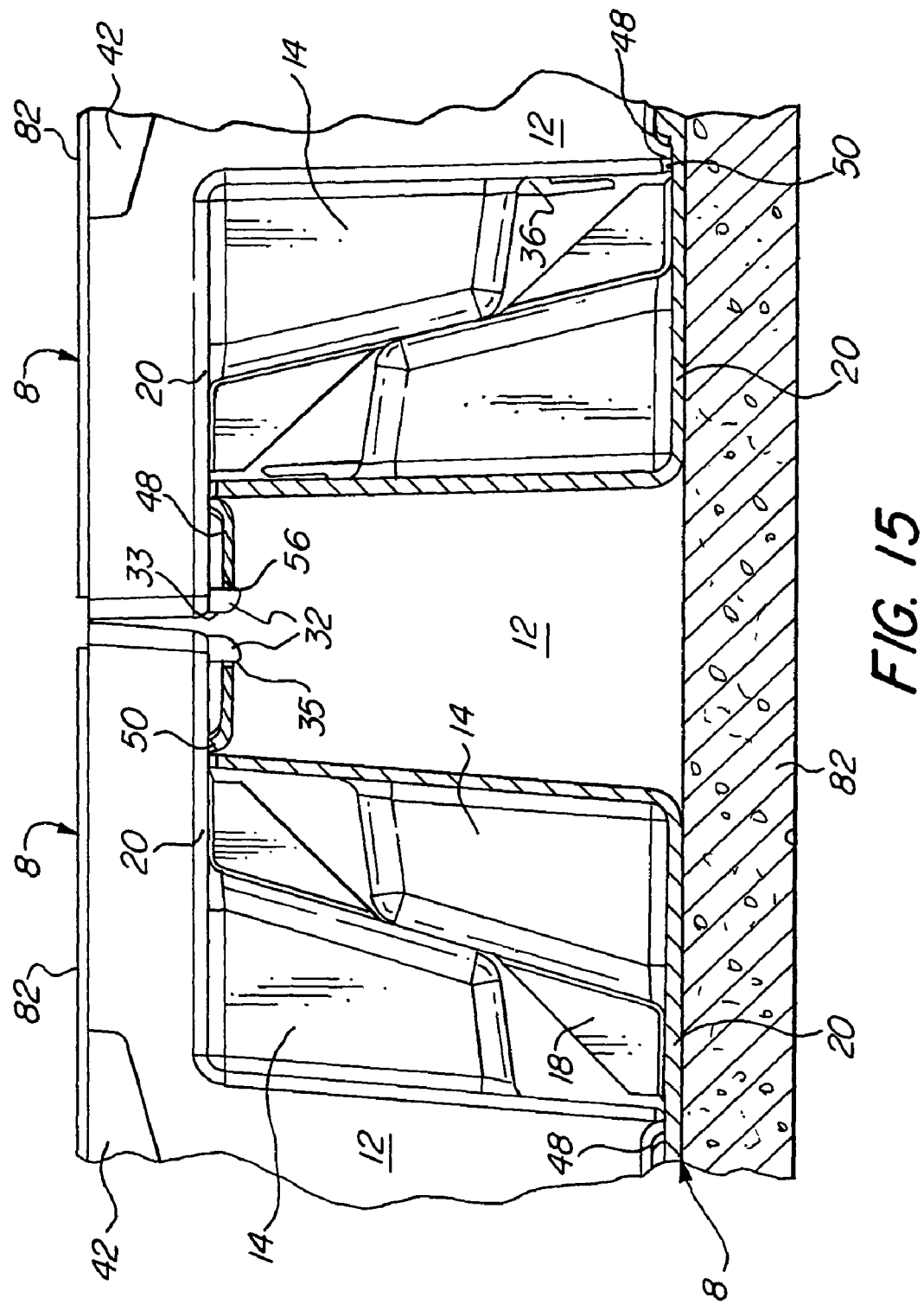
FIG. 15 is a fragmentary elevational view, drawn to an enlarged scale and showing, in a unified assemblage of the kind depicted in FIG. 14, a pair of lug pieces on two outer roof blocks engaged within an aperture in the pedestal portion of a roof block centrally disposed therebetween and shown in partial cross section.

Turning finally now to FIGS. 14 and 15, a unified, compact assemblage of a multiplicity of roof blocks embodying the present invention is depicted. The assemblage consists of 64 blocks; i.e., four layers (taken horizontally, front to back), each layer consisting (taken vertically) of a bottom tier and a top tier of four blocks each, two intermediate tiers of three blocks each, and a block at each end. As can be seen, the pedestal portions 12 of interpositioned blocks are nested within the spaces defined between the pedestal portions 12 of laterally adjacent blocks, and the blocks of the intermediate tiers are stacked in base-to-base relationship to one another;

the top walls 48 (via ridges 50) of the blocks of one tier are supported upon the upper wall sections 20 of the blocks of overlying or underlying tiers.

FIG. 15 shows the manner by which a central roof block, inverted relative to the two directly adjacent blocks, is disengagably held in assembly. In particular, the lug formations 32 of the laterally adjacent blocks are engaged within the relatively large apertures 56 in the top wall 48 of the central block (only one pair of lug formations, and one aperture, being visible however in FIG. 15), thereby interengaging the blocks as a unified, compact assemblage. In addition, the structures on the opposite ends of the bodies (i.e., the indented areas 44 and coupling flanges 42) of the blocks in each tier, and on the ends of the assemblage, are interengaged with one another so as to provide security against inadvertent disassembly in a transverse direction as well. As will be appreciated, these relationships are repeated throughout the entire array.

Thus, it can be seen that the present invention provides a roof block, and a roof block assembly, that satisfies the criteria hereinabove set forth. It will be appreciated by those skilled in the art that many variations in the particular form of roof block and roof block assembly described herein can be made without departure from the unique concepts of the present invention, and that such different embodiments are encompassed by the appended claims.

Having thus described the invention, What is claimed is:

1. A roof block for providing underlying support for a plurality of elongate members, comprising a substantially hollow body including a base portion and a pedestal portion upstanding on said base portion; said pedestal portion having an upper section comprised of a top wall and being configured to provide underlying support for a plurality of elongate members extending transversely thereacross, said pedestal portion having at least one passage extending downwardly thereinto through said top wall, said passage including an aperture in said top wall, and said upper section of said pedestal portion having structure defining at least one transverse channel extending thereinto beneath said top wall and associated, in an intersecting relationship, with said at least one downwardly extending passage, said at least one transverse channel being dimensioned and configured for receiving therein a separate fastening element for engagement with a rod inserted into said at least one downwardly extending passage, and said top wall of said upper section having indicia thereon to facilitate location of fasteners comprising hold-down means for transversely extending elongate members supported by said pedestal portion, said indicia comprising at least a first multiplicity of discrete elements extending in generally opposite directions from said aperture comprising said at least one downwardly extending passage.

2. A roof block for providing underlying support for a plurality of elongate members, comprising a substantially hollow body including a base portion and a pedestal portion upstanding on said base portion; said pedestal portion having an upper section comprised of a top wall and being configured to provide underlying support for a plurality of elongate members extending transversely thereacross, said pedestal portion having at least one passage extending downwardly thereinto through said top wall, said at least one passage including an aperture in said top wall, and said upper section of said pedestal portion having structure defining at least one transverse channel extending thereinto beneath said top wall and associated, in an intersecting relationship, with said at least one downwardly extending passage, said at least one transverse channel being dimensioned and configured for receiving therein a separate fastening element for engagement with a rod inserted into said at least one downwardly extending passage.

3. The roof block of claim 2 wherein said at least one transverse channel has an open outer end and an effectively closed inner end, said closed inner end being defined by stop structure disposed proximate said top wall aperture of said at least one downwardly extending passage and on the side of said aperture remote from said outer end of said at least one transverse channel.

4. The roof block of claim 3 wherein said stop structure defining said closed end of said at least one transverse channel is dimensioned and configured to engage a fastening nut against rotation.

5. The roof block of claim 2 comprising a plurality of said downwardly extending passages at laterally spaced locations in said pedestal portion, and an equal plurality of said associated, intersecting transverse channels.

6. The roof block of claim 5 wherein at least one of said plurality of downwardly extending passages, and said associated transverse channel, is of larger dimensions than at least one other of said downwardly extending passages and associated transverse channel.

7. The roof block of claim 2 wherein said pedestal portion includes internal structure defining at least one tubular member extending from said at least one transverse channel and cooperatively defining said at least one downwardly extending passage with which said at least one transverse channel is associated.

8. The roof block of claim 2 wherein said upper section of said pedestal portion is configured to provide constraining underlying support for transversely extending elongate members.

9. The roof block of claim 8 wherein said constraining underlying support is provided by a plurality of laterally spaced recess formations.

10. The roof block of claim 9 wherein said upper section of said pedestal portion comprises upwardly projecting ridge structure extending laterally along opposite sides of said top wall, said ridge structure having a plurality of pairs of transversely aligned, laterally spaced recesses formed thereinto to provide said recess formations.

11. The roof block of claim 2 wherein indicia are provided on said top wall of said upper section to facilitate location of fasteners comprising hold-down means for transversely extending elongate members supported by said pedestal portion.

12. The roof block of claim 2 wherein said base portion defines an upwardly extending underlying recess, and wherein said roof block additionally includes a rigid insert piece fabricated from a readily deformable material and seated within said underlying recess, at least portions of said insert piece protruding outwardly from said underlying recess for contact with a supporting roof surface.

13. The roof block of claim 12 wherein said base portion comprises an upper wall and a surrounding peripheral wall depending therefrom and cooperatively defining therewith said underlying recess; and wherein said peripheral wall has a multiplicity of tab elements projecting therefrom at peripherally spaced locations, said tab elements being disposed within said underlying recess and oriented toward said upper wall of said base portion with a said insert piece seated in said underlying recess thereof, said tab elements engaging an edge of said insert piece and thereby preventing inadvertent disassembly thereof.

14. The roof block of claim 13 wherein said tab elements are resiliently deflectable.

15. The roof block of claim 2 wherein said body is integrally formed, as a single piece, from a synthetic resinous material.

16. The roof block of claim 2 wherein said roof block is symmetrical at least about a laterally extending central plane.

17. The roof block of claim 16 wherein said base portion and said pedestal portion of said body are both of generally rectangular cross section, and wherein said pedestal portion is comprised of a pair of relatively wide side walls and a pair of relatively narrow end walls, at least said side walls converging slightly in the upward direction, toward said central plane, so as to impart an upward taper to said pedestal portion.

18. The roof block of claim 2 additionally including a multiplicity of lug formations projecting upwardly of said upper wall of said base portion at spaced locations about the periphery thereof.

19. The roof block of claim 18 additionally including a constraint member having at least one aperture dimensioned, configured, and located to receive and engage at least one of said lug formations, said constraint member being constructed to enable attachment to a structure on which said roof block is supported.

20. A roof block for providing underlying support for a plurality of elongate members, comprising a substantially hollow body including a base portion and a pedestal portion upstanding on said base portion; said pedestal portion having an upper section comprised of a top wall and being configured to provide underlying support for a plurality of elongate members extending transversely thereacross, said pedestal portion having at least one passage extending downwardly thereinto through said top wall, said passage including an aperture in said top wall, said top wall of said upper section having indicia thereon to facilitate location of fasteners comprising hold-down means for transversely extending elongate members supported by said pedestal portion, said indicia comprising a multiplicity of discrete elements extending in generally opposite directions from said aperture in said top wall.

21. The roof block of claim 20 wherein at least one set of said indicia lie substantially on a generally rectilinear axis.

22. The roof block of claim 21 wherein the centerline of said at least one downwardly extending passage substantially intersects with said generally rectilinear axis.

23. The roof block of claim 20 wherein said elements of said indicia are detents formed into the upper surface of said top wall.

24. The roof block of claim 20 wherein said upper section of said pedestal portion is formed with engaging structure, extending downwardly from the underside of said top wall, for engaging the threads of a screw inserted through said top wall at the location of each of said indicia.

25. The roof block of claim 24 wherein said engaging structure comprises at least one pair of transversely spaced, laterally extending parallel wall elements.

26. The roof block of claim 25 wherein said engaging structure comprises a plurality of pairs of transversely spaced, laterally extending parallel wall elements.

27. The roof block of claim 25 wherein said pedestal portion includes internal structure defining at least one tubular member extending from said at least one transverse channel; and wherein one of said wall elements is provided by internal wall structure comprised of first panels extending from, and along the length of, said at least one tubular member and constituting internal reinforcement for said pedestal portion.

28. The roof block of claim 27 wherein said internal wall structure additionally includes second panels extending transversely of said pedestal portion from opposite sides of said at least one tubular member.

29. The roof block of claim 27 comprising a plurality of said downwardly extending passages at laterally spaced location in said pedestal portion, and an equal plurality of said associated, intersecting transverse channels, said internal structure defining a plurality of tubular member extending from said transverse channels.

30. A unified assembly of a multiplicity of at least three substantially identical roof blocks, each of said roof blocks being symmetrical at least about a laterally extending central plane and comprising a substantially hollow body including a base portion, having an upper wall, and a pedestal portion upstanding on said base portion, said pedestal portion having an upper section comprised of a top wall and being configured to provide underlying support for a plurality of elongate members extending transversely thereacross, said pedestal portion having at least one passage extending downwardly thereinto through said top wall, substantially on said central plane, said at least one passage including an aperture in said top wall; both said base portion and also said pedestal portion of said each roof block being of generally rectangular cross section, said pedestal portion being comprised of a pair of relatively wide side walls, disposed to opposite sides of said central plane, and a pair of relatively narrow end walls disposed generally perpendicular to said central plane; and said each roof block additionally including at least one lug formation projecting upwardly of said upper wall of said base portion at least at one location along each of the opposite sides thereof; said roof blocks being arranged in alignment with one another with said central planes thereof parallel, with a central one of said roof blocks inverted relative to two directly adjacent roof blocks, with the pedestal portion of said central roof block nested between the pedestal portions of said adjacent roof blocks, and with said lug formations of said adjacent roof blocks engaged within said at least one aperture in said top wall of said central roof block so as to secure said roof blocks in unified assembly with one another.

31. The assembly of claim 30 wherein said pedestal portion has a plurality of said passages therein, wherein there are two of said lug formations along each of said opposite sides of said base portion, and wherein said lug formations are engaged within two of said apertures, in said top wall of said central roof block, comprising two of said passages.

32. The assembly of claim 30 wherein each of said lug formations is of semicircular cross section and disposed with a diametrical side facing outwardly and a curved side facing inwardly, wherein said at least one aperture in said top wall is circular, and wherein the diameters of said lug formations are such that a pair of said lug formations are snugly received, with their diametrical sides contiguous, in said at least one engaging aperture, one of said pair of engaged lug formations being present on each of said adjacent roof blocks.

* * * * *